April 9, 1929.  F. E. COATSWORTH  1,708,356
INCUBATOR TRAY AND EGG TURNING SLIDE
Filed July 6, 1926
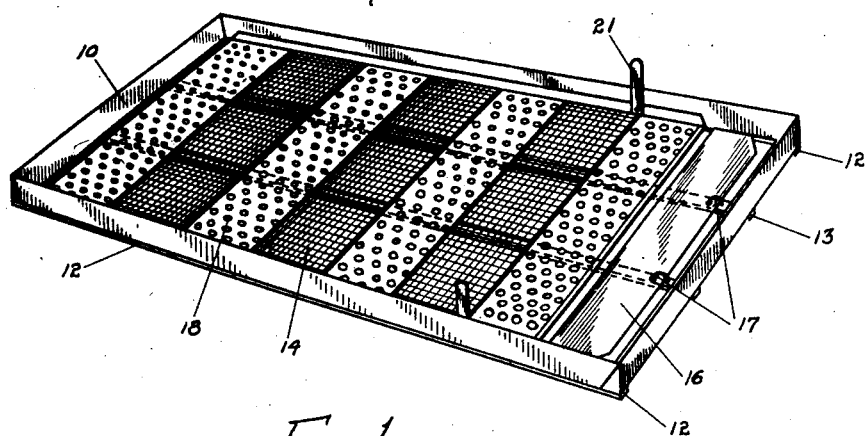
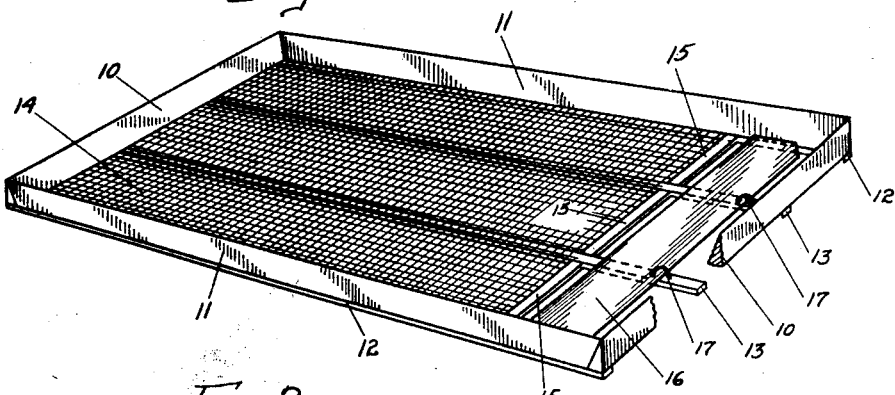
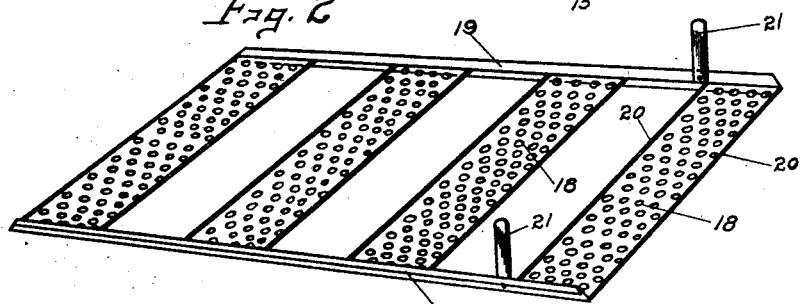
F. E. COATSWORTH Inventor
By Emil F. Lange
Attorney Patented Apr. 9, 1929.

1,708,356

UNITED STATES PATENT OFFICE.

FRANK E. COATSWORTH, OF LINCOLN, NEBRASKA.

INCUBATOR TRAY AND EGG-TURNING SLIDE.

Application filed July 6, 1926. Serial No. 120,783.

My invention relates to incubator trays and more particularly to an accessory for incubator trays whereby all of the eggs in the tray may be turned simultaneously and in the same direction, the egg turning movement being accomplished with the minimum of effort with a simple movement of the hand requiring an almost insignificant period of time. It is my object also to so position the parts that the handles whereby the turning of the eggs is effected will be in the most convenient position. Furthermore, it is my object to provide a tray and egg-turning accessory of extremely simple design for effectively accomplishing the object without interfering with the ventilation of the incubator.

Having in view these objects and others which will be pointed out in the following description, I will now refer to the drawings, in which Figure 1 is a view of the tray alone with a part broken away to disclose the form of the walls.

Figure 2 is a view of the egg turning slide.

Figure 3 is a view of the slide in place in the tray.

All of the views are in perspective.

The tray shown in Figure 1 is formed of end walls 10 and side walls 11. Secured to the under side of the frame are four slats 12 and 13 extending from one end to the other of the tray, the slats 12 being positioned at the lateral edges of the tray. The screen 14 is secured between the side walls 11 and the slats 12 and it passes over the slats 13, terminating short of the front or near end of the tray. The slats 15 are secured to and in the plane of the slats 12 and 13, the screen 14 extending only to the slats 15 and being secured thereto. The bottom of the tray forward of the slats 15 is thus open, the opening being closed by means of a pivoted closure 16. This closure 16 is preferably made from a strip of sheet metal of the required dimensions and it is provided with two apertures through which it may be hingedly secured to the slats 13 by means of the staples 17. The closure 16 is, of course, designed to prevent the eggs from falling out of the tray during incubation and it may be readily lifted to its opening position to permit the chicks to fall through at the end of the hatching period.

The slide shown in Figure 2 is formed of transverse perforated slats 18 and side members 19. The slats are perforated to give ample ventilation and their edges are lapped over at 20 on the upper side. The side members 19 are inclined to correspond with the inclination of the inner surface of the sides 11 of the tray and their edges are lapped over outwardly at their upper edges as shown in Figure 2. The slats 18 are secured to the side members 19 by welding or by any other desired securing means. Secured to the side members 19 adjacent their front ends are two handle members 21 for grasping the slide to move it forward or backward.

In use, the slide shown in Figure 2 is placed in the tray in the manner shown in Figure 3 and the gate 16 is placed in its closed position. The slide is in contact with the screen 14, and since it is made of thin sheet steel it does not add appreciably to the thickness of the bottom of the tray. The entire tray is then filled with eggs and placed in the incubator. At intervals when the eggs are to be turned, the incubator door is first opened and the slide is moved by grasping the two handles 21. The movement of the slide turns the eggs simultaneously in the same direction. This is because the strips 18 have sufficient thickness at their lapped edges to engage the eggs and to cause their movement and especially because the rolling movement imparted by the slats 18 to some of the eggs is communicated to the other eggs in the tray, the edge walls of the tray serving as baffles to prevent egg movement other than rolling of the eggs. The slide has two extreme positions and a full movement in either direction will cause the turning of the eggs. Thus if the first movement is forward, the next movement of the slide will be rearward. When the hatch is ready to come off, the slide is placed in the position as shown in Figure 3, so as to clear the opening at the front or near end of the tray, and the closure 16 is then lifted to its open position. After this the eggs are not disturbed and the hatch is allowed to proceed until completed.

The tray and its slide are both of very simple construction. The tray itself is preferably made from wood with the exception of the reticulated bottom 14 and the closure 16. The end and side walls 10 and 11 respectively are made from wedge shaped strips of wood which are united at the corners, the ends of the strips 11 being cut on the bevel, as shown in Figure 1. The strips 12, 13 and 15 all have the same width and thickness so that it is simply necessary to cut the strips into the proper lengths and to unite them in the manner shown. The slide is of all metal construction but of extreme simplicity. The strips 18 are all uniform in width and length and they are made by simply cutting sheet metal into strips of the proper dimensions and by lapping their edges. The side edges 19 of the slide are also made of sheet steel which is bent into angle form and lapped outwardly on its upper edge. The strips 18 and the handles 21 are each secured to the side edges by welding or by any other suitable but simple securing means. The operation of the slide is also a matter of extreme simplicity since it requires merely the opening of the incubator door and the pushing or pulling of the slide through the handles 21.

Having thus described my invention in such full, clear, and exact terms that its construction and operation will be readily understood by others skilled in the art to which it pertains, what I claim as new and desire to secure by Letters Patent of the United States is:

1. An egg tray and an egg turning device therefor, said tray including a bottom for supporting the eggs in frictional contact therewith and terminating short of the forward end of the tray to provide an opening for the exit of the chicks, the opening extending entirely across the tray, and a closure for the opening, said egg turning device comprising a plurality of horizontally positioned slats secured together in parallel and spaced apart relation and having overall dimensions which are substantially equal to the dimensions of said bottom whereby said egg turning device is slidable either over the opening at the end of said tray or over said closure, said slats being in slidable contact with the floor of said tray and being adapted to frictionally engage the under surfaces of the eggs.

2. An egg tray and an egg turning device therefor, said egg turning device having substantially the width of said egg tray and having a length which is less than the length of the egg tray whereby it is slidable in a lengthwise direction in said egg tray, said egg turning device consisting of a plurality of horizontally positioned transverse slats connected together in parallel and spaced apart relation and being adapted to frictionally engage the under surfaces of the eggs, and an upstanding handle secured to said egg turning device adjacent the forward extremity thereof.

In testimony whereof I affix my signature.

FRANK E. COATSWORTH.